United States Patent [19]

Hess et al.

[11] 3,888,290

[45] June 10, 1975

[54] TIRE CHAIN TIGHTENER

[75] Inventors: Daniel E. Hess; David William Bannier, both of York, Pa.

[73] Assignee: American Chain Cable Company, Inc., Bridgeport, Conn.

[22] Filed: Dec. 1, 1972

[21] Appl. No.: 311,096

[52] U.S. Cl. ............................................. 152/217
[51] Int. Cl. ........................................... B60c 27/10
[58] Field of Search ............ 152/217, 218, 219, 241

[56] References Cited
UNITED STATES PATENTS
1,439,096   12/1922   Golphin ............................ 152/219
FOREIGN PATENTS OR APPLICATIONS
797,585   10/1968   Canada .............................. 152/217
820,171   11/1937   France .............................. 152/241

Primary Examiner—James B. Marbert
Attorney, Agent, or Firm—Pennie & Edmonds

[57] ABSTRACT

A tightening device for shortening the length of a chain and locking it in shortened position. The device is constructed as a plate shaped member with attaching means at one end for attaching the member to one link of a chain. The opposite end of the member is shaped for insertion through a second spaced link of the chain as the member is rotated about the first link. The member also includes a camming surface engaging the second link for drawing it toward the first link upon such rotation. Finally, a locking means is provided along the camming surface for receiving the second link as it is drawn toward the first link to lock it in shortened position.

7 Claims, 3 Drawing Figures

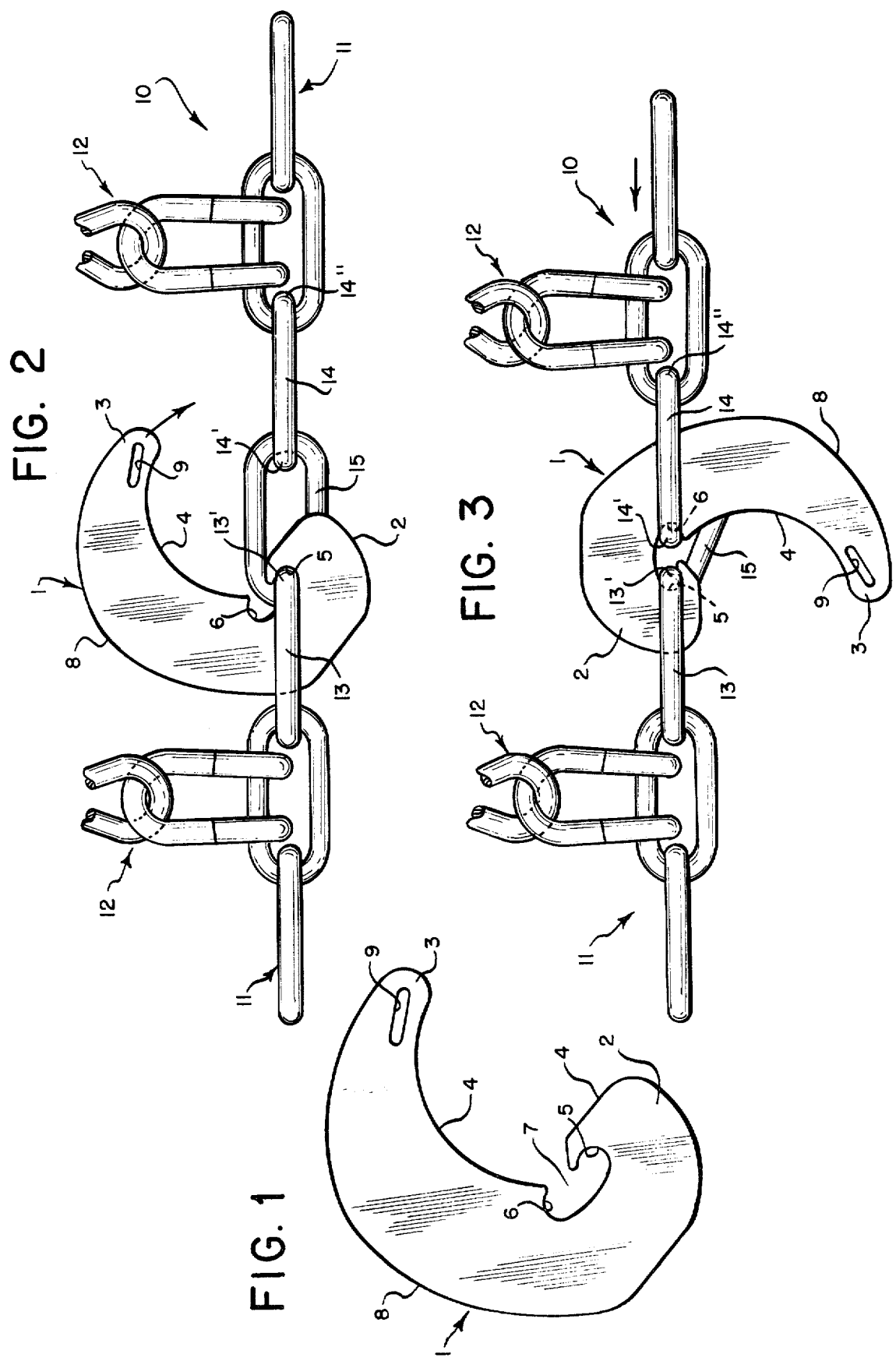

TIRE CHAIN TIGHTENER

BACKGROUND OF THE INVENTION

Tire chains when mounted on wheels of vehicles to improve traction on snow, ice or in mud are seldom properly tensioned unless adjusted by some supplementary device. Devices conventionally used to maintain proper tension have included spring or elastic members attached to the chain along the side of the tire. These devices tension the chain on the tire; but allow the chain to move away from the tire when subjected to the centrifugal forces generated by the rotating wheel. The resulting looseness causes the chain to impact against the vehicle and also against the road bed. This produces excessive wear of the chain and shortened chain life. This looseness can also damage the tire as well as the vehicle.

Other devices for maintaining tire chains tight upon tires have been incorporated integrally with the tire chain itself. These devices are generally cumbersome in construction and increase both the weight and cost of the chain. They also must be kept on the chain even when not necessary or desired.

SUMMARY OF THE INVENTION

According to the teaching of the present invention, the slackness of a chain, such as a tire chain, is taken up through the use of a simple, rigid, crescent shaped disc. The disc has an attaching end that fits on a first link of the chain for rotation about that link. The opposite end of the disc defines a handle which is adapted to be rotated through a second spaced link. The surface of the disc between its ends is concave and defines a camming surface which is adapted to bear against the inner surface of the second link. The camming surface is shaped so that as the handle of the disc is rotated through the second link, it bears on the second link and draws it toward the first link. At a predetermined location along the camming surface, a locking means is constructed for receiving the second link and locking it in drawn or tightened position.

BRIEF DESCRIPTION OF THE DRAWINGS

FIG. 1 is a side view of the tightening device of the present invention;

FIG. 2 is a view of the tightening device attached to a first link of a chain to be tightened; and FIG. 3 is a view of the tightening device secured to the chain with a second spaced link in shortened, locked position.

DETAILED DESCRIPTION OF THE PREFERRED EMBODIMENT

The tire chain tightener 1 constructed in accordance with the teaching of the present invention is shown in FIG. 1 as being a flat plate like member. More particularly, it is a disc having a crescent shape with one end defining an attaching end 2 and the other end defining a handle 3. The attaching end and handle are connected by a concave surface 4 which is provided with first and second slots 5 and 6 at the attaching end. As shown in FIG. 1, the slots 5 and 6 have a common entrance 7 formed in the concave surface 4. The two slots 5 and 6 together with their common entrance 7 form a generally C-shaped opening in the camming surface 4 with the size of the entrance being less than twice the diameter of either of the links 13 and 14.

The outer surface 8 of the disc is convex and connects to the ends of the concave surface 4. Also, as shown in FIG. 1, the handle end of the disc is provided with a closed slot 9 which is adapted for receiving an appropriately shaped tool for assisting in locking the disc onto the tire chain as will become evident from the following description.

In FIG. 2 the tire chain tightener 1 is shown with a portion of a tire chain 10. The side section 11 of the chain is shown in a horizontal position; but when fitted on a car tire, it will assume a substantially circular shape concentric with the wheel. The sections 12 of the chain shown depending from the side section 11 are those that fit across the running surface of the tire.

In FIG. 2 the tire chain tightener is shown with its attaching end 2 inserted through a first link 13 of the chain 10. The tightener is placed with the end 13' of this link received within the first slot 5. This slot functions as an attaching means for the link 13 and is shaped to permit rotation of the tightener about the end 13' of the link 13.

In order to tighten the chain links 11, the handle end 3 of the tightener is inserted through the second adjacent link 14 by rotating it in a clockwise direction from the position shown in FIG. 2. The initial rotation of the handle through the link 14 may readily be done by hand since it does not require any movement of the chain links. Once the slot 9 is moved to a position through the link 14, a screwdriver or similar tool may be inserted into the slot 9 to facilitate further rotation in a clockwise direction. Such clockwise movement will cause the concave surface 4 to engage against the inner surface of the end 14' of the link 14. This surface 4, between the handle end and the slots 5 and 6, acts as a camming surface whereupon continued rotation will draw the link 14 toward the link 13.

The drawing of the link 14 along the concave camming surface 4 continues until the end 14' of this link reaches the entrance 7 to the slots 5 and 6. As the end 14' moves off the camming surface 4 it falls through the entrance and into the second slot 6. This second slot 6 functions as a locking means for holding the link 14 in its shortened, spaced position relative to the link 13. The intermediate connecting link 15 between links 13 and 14 simply hangs loose when the member has been moved to its final locked position.

As shown in FIG. 3, the seating surfaces of the slots 5 and 6 against which the ends of the links 13 and 14 sit when in tightened position face each other so as to hold the links 13 and 14 in alignment along a single axis. With this relationship between the seating surfaces, centrifugal force created on the tire chain links 11 during movement of the wheel will tend to press the links 13 and 14 against their seating surfaces and thus aid in holding the links in their tightened position. Also, the restricted size of the entrance aids in retaining the links 13 and 14 in place, since it requires that one link at a time be passed through the entrance. General looseness of the links in their respective slots as might occur when the vehicle is at a standstill will normally result in the links interfering with each other and thus prevent falling out of the restricted entrance.

The overall size and outer shape of the convex surface 8 of the tightener prevents the tightener from falling off of the chain during use. In particular, the convex surface 8 is shaped so as to engage the inner surface of the end 14″ of the link 14 in the event that forces are created which tend to rotate the tightener in a counterclockwise, unlocking direction. Engagement of the surface 8 against the end 14′ will immediately preclude any further movement in the unlocking direction. This safety locking feature of the tightener results since once the link 14 is locked within the slot 6, it cannot move away from the link 13 when the tightening member is moved in a counterclockwise direction.

The tightener of the present invention is an improvement over prior chain tightener constructions from the standpoint of both cost and ease of operation. The plate like construction of the tightener facilitates manufacture at low cost by such means as stamping. Also, the tightener does not require alteration or modification of the conventional tire chain and can be quickly attached when required. In addition to being usable for tightening tire chains, the tightener of the present invention can also be used as a replacement link for broken side links.

To remove the tightening member from the chain, the entire chain is first loosened by releasing the conventional attaching links at the ends of the chain. Once this has been done, the tension in the side links is released and the links 13 and 14 can readily be withdrawn through the entrance 7.

What is claimed is:

1. A tightening device for shortening the length of a chain, comprising:
   a. a flat plate like member of unitary structure having:
      1. open ended slot attaching means disposed at one end for removably receiving the first link of a chain to permit rotation of the member about said link,
      2. a handle defined by the other end of the member, said handle being adapted to be inserted through a second link spaced from the first link upon rotation of said member about the end of the first link,
      3. a concave surface extending along one edge of said member from said handle toward said first attaching means, said concave surface defining a camming surface for engaging the inner surface of the end of the second link and drawing it toward the first link as the handle is moved through the second link and the member is pivoted about the first link, and
      4. locking means at the end of the camming surface adjacent the attaching means for receiving the end of the link as it moves along said camming surface toward the first link, said attaching and locking means being spaced from each other to hold the first and second links in shortened spaced relation when received thereby.

2. A device according to claim 1 wherein:
   a. said locking means comprises slots formed in said member for receiving the ends of said first and second links.

3. A tightening device for shortening the length of a chain, comprising: (a) a flat plate like member of unitary structure having:
   1. open ended slot attaching means disposed at one end for receiving the first link of a chain to permit rotation of the member about said link,
   2. a handle defined by the other end of the member, said handle being adapted to be inserted through a second link spaced from the first link upon rotation of said member about the end of the first link,
   3. a concave surface extending along one edge of said member from said handle toward said first attaching means, said concave surface defining a camming surface for engaging the inner surface of the end of the second link and drawing it toward the first link as the handle is moved through the second link and the member is pivoted about the first link,
   4. locking means at the end of the camming surface adjacent the attaching means for receiving the end of the link as it moves along said camming surface toward the first link, said attaching and locking means being spaced from each other to hold the first and second links in shortened spaced relation when received thereby, and
   5. said attaching and locking means defined by slots in said concave surface disposed at one end of said member for receiving the ends of said first and second links.

4. A device according to claim 3 wherein:
   a. said slots have a common entrance from the concave surface of the member, the entrance being of a size less than twice the cross-sectional dimension of each of said links.

5. A device according to claim 4 wherein:
   a. said member is a crescent shaped disc having a convex surface joining the ends of the concave surface and shaped for engaging against the inner surface of the other end of the second link upon rotation of the handle through said second link in an unlocking direction when both links are received within their respective slots, said engagement precluding removal of the handle from said second link.

6. A device according to claim 5 wherein:
   a. said first and second slots are shaped to define first and second seating surfaces, respectively, which face each other and on which the ends of the first and second links seat.

7. A device according to claim 6 wherein:
   a. said first and second slots together with their common entrance define a generally C-shaped opening in the concave surface of said member.

* * * * *